(12) United States Patent
Lee et al.

(10) Patent No.: US 10,098,042 B2
(45) Date of Patent: Oct. 9, 2018

(54) MME, LOCAL SERVER, MME-LOCAL SERVER INTERFACE, AND DATA TRANSMISSION METHOD FOR OPTIMIZED DATA PATH IN LTE NETWORK

(71) Applicant: Samsung Electronics Co., Ltd., Suwon-si, Gyeonggi-do (KR)

(72) Inventors: Jinsung Lee, Seoul (KR); Kisuk Kweon, Suwon-si (KR); Jungshin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 14/600,644

(22) Filed: Jan. 20, 2015

(65) Prior Publication Data
US 2015/0208291 A1 Jul. 23, 2015

(30) Foreign Application Priority Data
Jan. 20, 2014 (KR) .................. 10-2014-0006508

(51) Int. Cl.
*H04W 36/00* (2009.01)
*H04W 76/25* (2018.01)
*H04W 36/12* (2009.01)
*H04W 76/22* (2018.01)
*H04W 76/12* (2018.01)

(52) U.S. Cl.
CPC ........ *H04W 36/0011* (2013.01); *H04W 36/12* (2013.01); *H04W 76/12* (2018.02); *H04W 76/22* (2018.02); *H04W 76/25* (2018.02)

(58) Field of Classification Search
CPC ............. H04W 36/0011; H04W 36/12; H04W 76/022; H04W 76/041; H04W 76/22; H04W 76/20; H04W 76/12; H04W 36/055; H04W 76/25
USPC ........................................................ 370/331
See application file for complete search history.

(56) References Cited

U.S. PATENT DOCUMENTS

| 8,111,630 | B2 | 2/2012 | Kowali et al. | |
| 8,320,260 | B2* | 11/2012 | Westerberg | H04W 24/02 370/242 |
| 2002/0136226 | A1* | 9/2002 | Christoffel | H04W 12/02 370/401 |
| 2010/0208658 | A1* | 8/2010 | Vesterinen | H04W 8/082 370/328 |

(Continued)

*Primary Examiner* — Un C Cho
*Assistant Examiner* — Shah Rahman
(74) *Attorney, Agent, or Firm* — Jefferson IP Law, LLP

(57) ABSTRACT

A Mobility Management Entity (MME), a local server, an MME-local server interface, and a data transmission method are provided. The communication method of an MME supporting inter-gateway handover of a terminal includes acquiring, when a handover from a source gateway to a target gateway is detected during an ongoing data communication of the terminal, information on a session between the terminal and a server and transmitting, when the server is a local server present in a mobile communication core network, a tunnel setup command to the local server through an interface established with the local server, the tunnel setup command instructing to establish a tunnel between the local server and the target gateway for data communication from the local server to the target gateway.

16 Claims, 24 Drawing Sheets

(56) References Cited

U.S. PATENT DOCUMENTS

| | | | |
|---|---|---|---|
| 2010/0208706 A1* | 8/2010 | Hirano | H04W 60/005 370/332 |
| 2011/0019609 A1* | 1/2011 | Zhong | H04L 12/4633 370/315 |
| 2011/0103310 A1* | 5/2011 | Stojanovski | H04L 12/66 370/328 |
| 2011/0170517 A1* | 7/2011 | Bakker | H04W 36/0033 370/331 |
| 2011/0261787 A1* | 10/2011 | Bachmann | H04L 63/029 370/331 |
| 2011/0274087 A1* | 11/2011 | Liang | H04W 76/34 370/331 |
| 2012/0127974 A1* | 5/2012 | Doppler | H04W 76/02 370/338 |
| 2012/0188895 A1* | 7/2012 | Punz | H04W 76/022 370/252 |
| 2012/0191862 A1 | 7/2012 | Kovvali et al. | |
| 2012/0218970 A1 | 8/2012 | Westberg et al. | |
| 2012/0320876 A1* | 12/2012 | Zhou | H04W 36/12 370/331 |
| 2013/0010756 A1* | 1/2013 | Liang | H04W 36/18 370/331 |
| 2013/0028237 A1* | 1/2013 | Cheng | H04W 36/0016 370/331 |
| 2013/0039343 A1* | 2/2013 | Hori | H04W 36/12 370/331 |
| 2013/0083773 A1* | 4/2013 | Watfa | H04W 36/0033 370/331 |
| 2013/0089076 A1* | 4/2013 | Olvera-Hernandez | H04W 36/08 370/332 |
| 2013/0157659 A1* | 6/2013 | Ikeda | H04W 12/08 455/435.1 |
| 2013/0188599 A1* | 7/2013 | Zakrzewski | H04W 36/023 370/331 |
| 2013/0189994 A1* | 7/2013 | Maehara | H04W 36/22 455/439 |
| 2013/0336174 A1* | 12/2013 | Rubin | H04W 16/28 370/280 |
| 2014/0059192 A1* | 2/2014 | Miklos | H04W 8/082 709/221 |
| 2014/0113637 A1* | 4/2014 | Guan | H04W 8/082 455/437 |
| 2014/0192780 A1* | 7/2014 | Kim | H04W 48/08 370/331 |
| 2014/0219179 A1* | 8/2014 | Zakrzewski | H04W 4/18 370/328 |
| 2014/0233384 A1* | 8/2014 | Howard | H04W 28/0289 370/235 |
| 2014/0348128 A1* | 11/2014 | Tani | H04B 7/155 370/331 |
| 2015/0071210 A1* | 3/2015 | Huang | H04W 8/26 370/329 |
| 2015/0181394 A1* | 6/2015 | Zuniga | H04W 72/005 370/312 |

* cited by examiner

MME, LOCAL SERVER, MME-LOCAL SERVER INTERFACE, AND DATA TRANSMISSION METHOD FOR OPTIMIZED DATA PATH IN LTE NETWORK

CROSS-REFERENCE TO RELATED APPLICATION(S)

This application claims the benefit under 35 U.S.C. § 119(a) of a Korean patent application filed on Jan. 20, 2014 in the Korean Intellectual Property Office and assigned Serial number 10-2014-0006508, the entire disclosure of which is hereby incorporated by reference.

TECHNICAL FIELD

The present disclosure relates to a Mobility Management Entity (MME), a local server, an MME-local server interface, and a data transmission method.

BACKGROUND

Local Internet Protocol Access (LIPA) and Selected Internet Protocol Traffic Offload (SIPTO) as work items of the 3rd Generation Partnership Project (3GPP) Release 10 work items allow for installing a femto cell based station (Home evolved Node B (HeNB)) in a home network or enterprise network (or a network deployed by a third party operator (e.g., content provider and Internet service provider) cooperating with a mobile carrier) such that the traffic of a User Equipment (UE) connected through the femto cell is delivered to other devices of the home network or the enterprise network through a local gateway (L-GW) directly.

FIG. 1 is a diagram illustrating an LIPA network structure in which the HeNB and the L-GW are integrated according to the related art.

Referring to FIG. 1, the UE attached to the HeNB may connect to the outside Internet via a Serving Gateway (S-GW) and a Packet Data Network Gateway (P-GW) or to a local network via an L-GW. The L-GW is provided with an interface capable of connecting to the local network and is installed by the operator near the UE in order to reduce the traffic of the core network connected to the Internet.

In the radio network structure of FIG. 1, if the UE goes out of the service area of the HeNB, it is difficult to guarantee the session continuity. That is, when the UE moves out of the service area, the session connected previously to the local network ends to establish a new session so as not to guarantee the session continuity. In order to solve this problem, there is a need of a method for supporting inter-HeNB mobility of the UE.

In 3GPP release 11, LIPA mobility and SIPTO at the local network (LIMONET) is proposed as a new work item for providing the local network with a traffic offload function as well as guaranteeing the session continuity on the macro network. In the LIMONET, the L-GW and HeNB are deployed separately from each other as shown in FIG. 2. Accordingly, the UE can be handed over among the HeNBs connected to one L-GW.

FIG. 2 is a diagram illustrating the LIMONET architecture according to the related art.

However, the LIMONET can guarantee the session continuity in inter-HeNB handover but not in inter-L-GW handover. If the UE moves so as to be handed over between HeNBs connected to different L-GWs, the old session has to end before starting a new session. Since the UE roams without consideration of the locations of the L-GWs, inter-L-GW handover is likely to occur frequently so as to cause frequent session breakages, resulting in significant problem independently of the size of service area of the L-GW.

There is therefore a need of a method of enhancing the LIMONET function that is capable of guaranteeing session continuity even in inter-L-GW handover.

Meanwhile, a Content Delivery Network (CDN) is a network proposed for efficient contents delivery through traffic offload of Internet Backbone network and quick response time.

FIG. 3 is a signal flow diagram illustrating a data communication method in a network using a CDN server according to the related art.

Referring to FIG. 3, when the UE accesses a specific content server (e.g., YouTube), it acquires the page information including the Uniform Resource Locator (URL) of a content from the content server at operation 301. If the user clicks on certain content in the page at operation 303, the UE requests a Domain Name System (DNS) server for the Internet Protocol (IP) address corresponding to the domain name included in the URL of the selected content at operation 305. The DNS server sends the UE the IP address of the nearest CDN server, and the UE establishes a session with the CDN server at operation 307 and downloads the selected content from the CDN server at operation 309. Recently, the CDN service provider (e.g., Akamai) established a partnership with main global mobile carriers (e.g., AT&T, Orange telecom, and KT) to deploy CDN servers in the mobile communication networks of the mobile carriers. Accordingly, it is expected that the content servers and mobile communication networks are associated with each other more closely in the future when the $5^{th}$ Generation (5G) mobile technology will be commercialized as compared with the present.

Meanwhile, the mobile carriers are preparing a new venture in which an eNB is equipped with a cache function for providing subscribers with CDN services. If the caching function is enabled at the eNB side, the eNB is capable of reading/writing files. However, the reading/writing is likely to be high load task for the eNB so as to cause processing overload. There is therefore a need of an efficient server management method for providing universal services such as file sharing and cloud services as well as CDN service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a new network entity called local server for guaranteeing session continuity and offloading in inter-local gateway (L-GW) handover and define a Mobility Management Entity (MME)-local server interface and an L-GW-local server interface to establish the best data transmission path between the User Equipment (UE) and the local server.

In accordance with an aspect of the present disclosure, a communication method of an MME supporting inter-gateway handover of a terminal is provided. The communication method includes acquiring, when a handover from a source gateway to a target gateway is detected during an ongoing data communication of the terminal, information on a session between the terminal and a server, and transmitting, when the server is a local server present in a mobile communication core network, a tunnel setup command to the local server through an interface established with the local server, wherein the tunnel setup command instructs to establish a tunnel between the local server and the target gateway for data communication from the local server to the target gateway.

In accordance with another aspect of the present disclosure, a communication method of a source gateway supporting inter-gateway handover of a terminal is provided. The communication method includes analyzing data exchanged between the terminal and a server, managing, when the server is a local server present in a mobile communication core network as a result of analysis, information on a session between the terminal and the local server, and transmitting the information on the session to an MME.

In accordance with another aspect of the present disclosure, a communication method of a local server supporting inter-gateway handover of a terminal is provided. The communication method includes receiving a tunnel setup command from an MME through an interface established with the MME, the tunnel setup command being generated when a handover from a source gateway to a target gateway occurs during an ongoing data communication with the terminal, setting up a tunnel with the target gateway through an interface established with the target gateway, and transmitting data addressed to the terminal to the target gateway through the tunnel.

In accordance with another aspect of the present disclosure, an MME supporting inter-gateway handover of a terminal is provided. The MME includes a communication unit which performs data communication, and a control unit which acquires, when a handover from a source gateway to a target gateway is detected during an ongoing data communication of the terminal, information on a session between the terminal and a server, and controls the communication unit to transmit, when the server is a local server present in a mobile communication core network, a tunnel setup command to the local server through an interface established with the local server, wherein the tunnel setup command instructs to establish a tunnel between the local server and the target gateway for data communication from the local server to the target gateway.

In accordance with another aspect of the present disclosure, a source gateway supporting inter-gateway handover of a terminal is provided. The source gateway includes a communication unit which performs data communication, and a control unit which analyzes data exchanged between the terminal and a server, manages, when the server is a local server present in a mobile communication core network as a result of analysis, information on a session between the terminal and the local server, and controls the communication unit to transmit the information on the session to an MME.

In accordance with another aspect of the present disclosure, a local server supporting inter-gateway handover of a terminal and present in a mobile communication network is provided. The local server includes a communication unit which performs data communication and a control unit which controls the communication unit to receive a tunnel setup command from an MME through an interface established with the MME, the tunnel setup command being generated when a handover from a source gateway to a target gateway occurs during an ongoing data communication with the terminal, set up a tunnel with the target gateway through an interface established with the target gateway, and transmit data addressed to the terminal to the target gateway through the tunnel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, if a User Equipment (UE) roams changing local gateway (L-GW), the Mobility Management Entity (MME) commands to establish a tunnel between the source and target L-GWs. The source L-GW transmits the data received from the external server (CN) to the target L-GW through the tunnel such that the UE can receive the data seamlessly after completing the handover to the target L-GW. That is, if the packet received from the external server (packet of which the destination is the Internet Protocol (IP) address of the UE) arrives at the source L-GW, the source L-GW forwards the packet to the target L-GW to which the UE is handed over and attached. Accordingly, the UE is capable of performing data communication seamlessly while maintain the same IP address even in the course of inter-L-GW handover.

According to various embodiments of the present disclosure, novel communication interfaces are defined between the MME and local servers deployed by the mobile carrier for diverse purposes in the Long Term Evolution (LTE) network of distributed architecture proposed for Local IP Access (LIPA) and Selected IP Traffic Offload (SIPTO) techniques, thereby maintaining the best data path between the UE and the local server always regardless of the roaming status of the UE.

Description of the technical features of the present disclosure is made in detail hereinafter.

Figure 1:
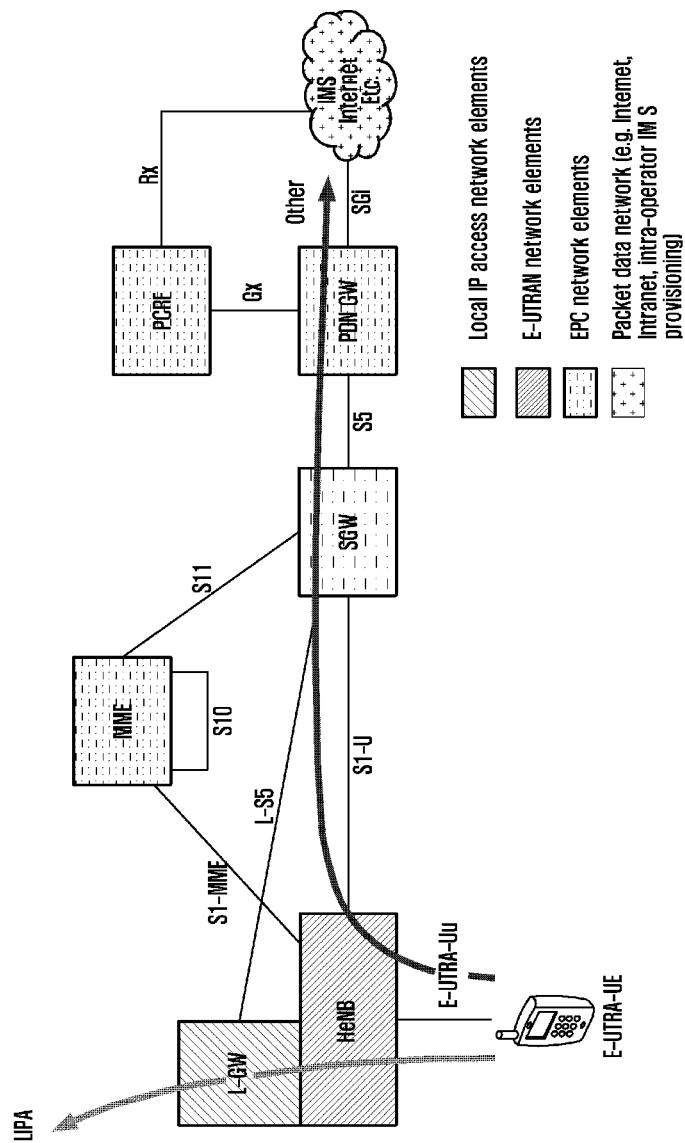
FIG. 1 is a diagram illustrating a Local Internet Protocol Access (LIPA) network structure in which the Home evolved Node B (HeNB) and the local gateway (L-GW) are integrated according to the related art.
Figure 2:
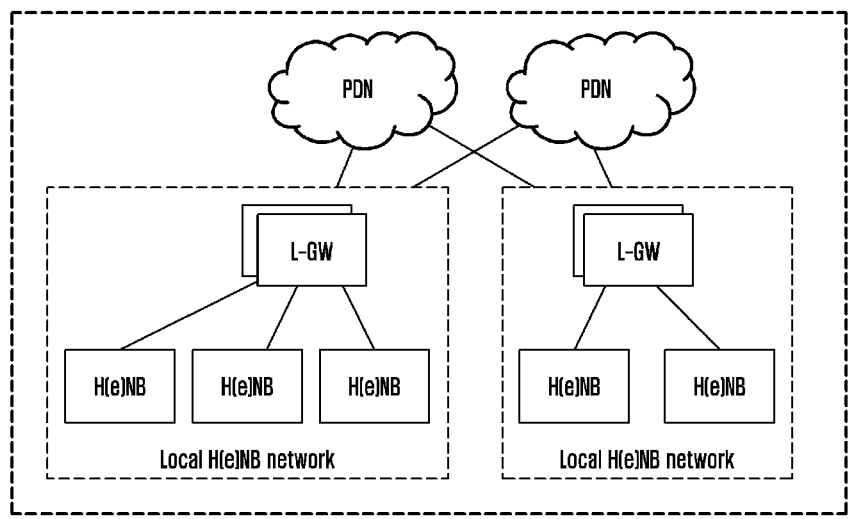
FIG. 2 is a diagram illustrating the local network (LIMO-NET) architecture according to the related art.
Figure 3:
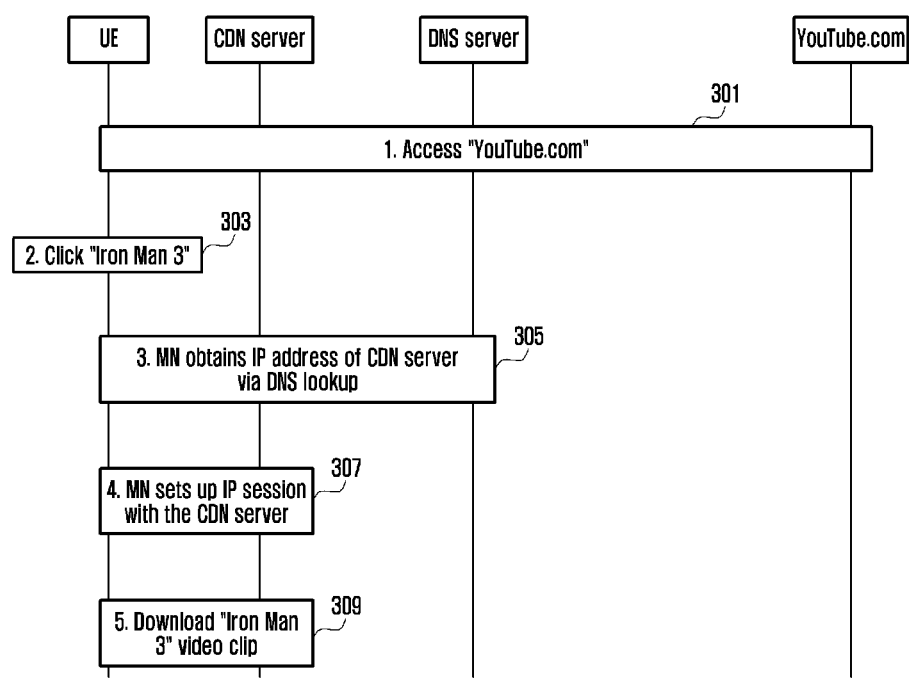
FIG. 3 is a signal flow diagram illustrating a data communication method in a network using a Content Delivery Network (CDN) server according to the related art.
Figure 4:
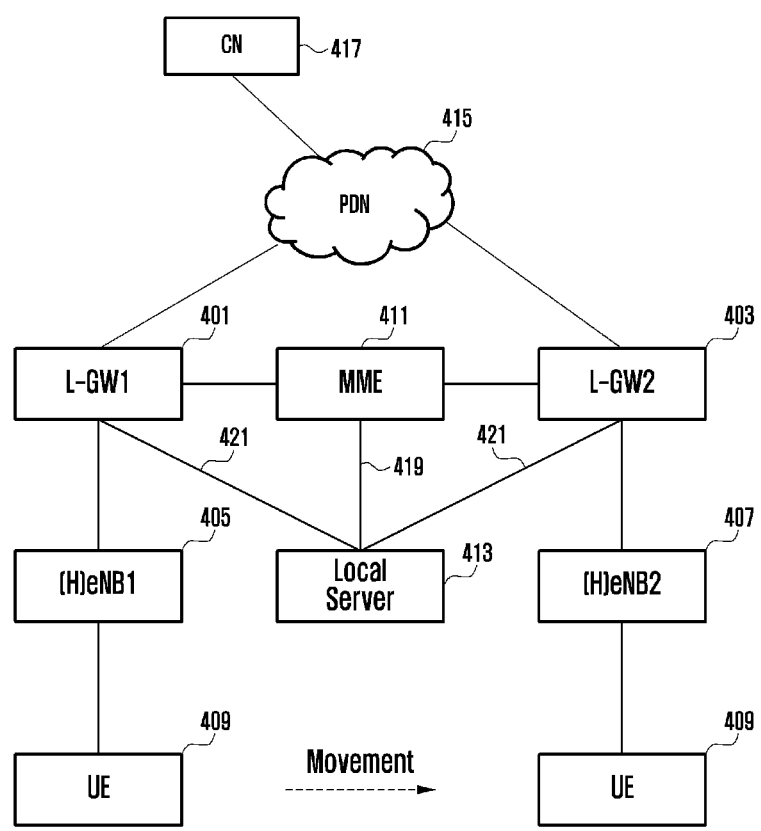
FIG. 4 is a diagram illustrating the network architecture including a local server according to an embodiment of the present disclosure.

FIG. 4 is a diagram illustrating the network architecture including a local server according to an embodiment of the present disclosure.

Referring to FIG. 4, the network according to an embodiment of the present disclosure, includes a plurality of L-GWs (L-GW1 and L-GW2) 401 and 403 and a plurality of Home evolved Node Bs (HeNBs) (HeNB1 and HeNB2) 405 and 407 connected to the respective L-GWs 401 and 403.

The UE 409 may download data (packets) from an external server (CN) 417 or a local server 413 via one of HeNB1 405 and HeNB2 407 and the L-GW (L-GW1 or L-GW2) connected to the eNB. In the case of downloading data from the CN 417, the UE 409 receives the packets through the session established with the external server 417 and, in the case of downloading data from the local server 413, through the session established with the local server 413.

The UE 409 may roam so as to move out of the service area of the source eNB and enter the service area of the target eNB. In this case, the UE 409 may perform a procedure of handover between the source and target eNBs to continue data communication through the target eNB. In the case that the source and target eNBs are connected to different L-GWs, the UE 409 has to perform inter-L-GW handover.

FIG. 4 is directed to the case where the UE 409 is handed over, in the state of being attached to the HeNB1 405, to attach the HeNB2 407. Since HeNB1 and HeNB2 are connected to different L-GWs 401 and 403, the UE is handed over from the HeNB1 405 to the target HeNB 407 through inter-L-GW handover procedure.

The MME 411 manages mobility of the UE 409 in handover and receives the information on the session status of the UE 409 and transmits control information for UE mobility through the interface to the L-GWs 401 and 403.

According to an embodiment of the present disclosure, the network includes a local server 413. The local server 413 is deployed near the UE 409 by a radio network operator (or third party related to the operator) or a content provider to store the contents in part (commercial contents or operator-specific contents) to reduce the traffic amount flowing to the PDN 415 and deliver the contents to the UE 409 through a shortest path. If the data requested by the UE 409 is stored in the local server 413, the UE 409 can receive the data quickly from the local server 413 via the L-GWs 401 and 403. If the data requested by the UE 409 is not stored in the local server 13, the UE receives the data from the CN 417 as the original server having the corresponding data in the normal procedure.

In order to accomplish this, new interfaces 419 and 421 are defined between the MME 411 and the local server 413 and between the L-GWs 401 and 403 and the local server 413 respectively in the present disclosure.

The interface between the MME 411 and the local server 413 are responsible for two tasks. First, the interface 419 between the MME 411 and the local server 413 can be used as a path for the local server 413 to send the session information (UE and its own IP address) to the MME 411 after establishing the session with the UE 409. The interface 410 between the MME 411 and the local server 413 is also used as the path for the MME to transmit a tunnel setup trigger message to the local server 413 to establish a tunnel with the source L-GW when the UE 409 performs inter-L-GW handover.

The interface 421 between the L-GW and the local server 413 can be used for tunnel setup and data communication through the tunnel. If the tunnel setup trigger message is received from the MME 411, the local server 413 performs the procedure of establishing the tunnel for use in data packet transmission to the target L-GW. The local server 413 sends the target L-GW the tunnel setup request message and, if a tunnel setup response message is received from the target L-GW, completes the tunnel setup procedure based thereon. The detailed description of the signaling procedure is made later.

A description is made of the data communication method of the network including a local server in detail hereinafter.

Method of Session Detection Between UE and Local Server

A session is established between the UE and the local server, when the UE attempts the downloading of data stored in the local server or wants data communication with the local server. At this time, the network can detect the session between the UE and the local server in two ways.

Figure 5:
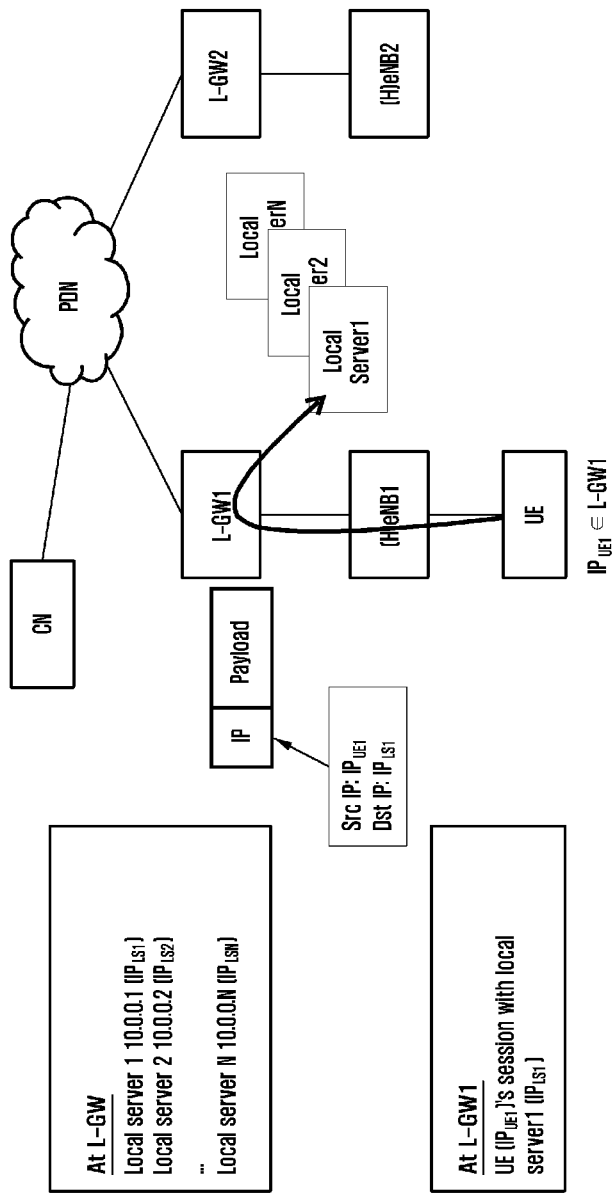
FIG. 5 is a diagram illustrating a User Equipment (UE)-local server session detection operation of the L-GW according to an embodiment of the present disclosure.

According to various embodiments of the present disclosure, the L-GW may detect the session between the UE and the local server as shown in FIG. 5.

FIG. 5 is a diagram illustrating a UE-local server session detection operation of the L-GW according to an embodiment of the present disclosure.

Referring to FIG. 5, when the UE establishes the session with the local server, the packet generated by the UE (e.g., Transmission Control Protocol Synchronize (TCP SYN) packet) is sent to the L-GW via the HeNB to which the UE is attached. The L-GW determines whether the received packet is addressed to the local server or for establishing a session with the local server. The L-GW may manage a list of the local server IP addresses and checks the destination IP address of the packet received from the UE through a deep packet inspection (DPI) process and determines whether the checked IP address is the local server IP address. If it is determined that the packet is the packet for session establishment with the local server or the packet addressed to the local server, this means that the session is established between the UE and the local server. The L-GW may retain and manage the IP addresses of the UE and local server in association with corresponding session. The session information can be used in the inter-L-GW handover afterward.

Figure 6:
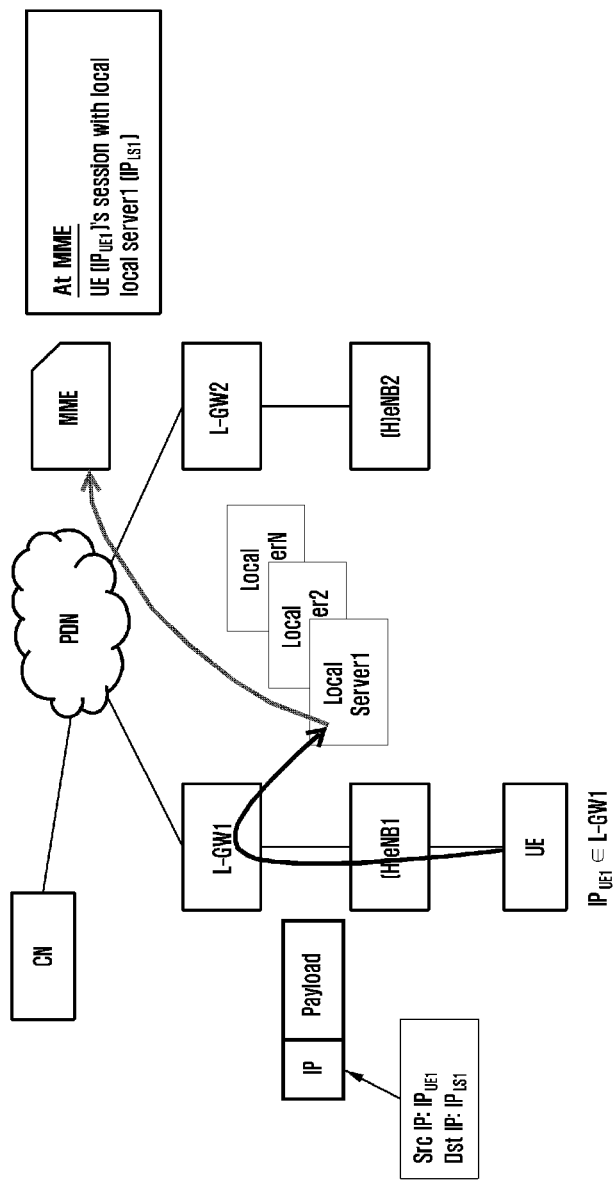
FIG. 6 is a diagram illustrating a UE-local server session detection operation of the Mobility Management Entity (MME) according to an embodiment of the present disclosure.

According to various embodiments of the present disclosure, the local server provides the MME with the session information as shown in FIG. 6 such that the MME detects the session between the UE and the location server. At this time, the interface defined between the local server and the MME is used. This method uses only the signaling between the local server and the MME without modification of the L-GW and thus may contribute to the signaling overhead of the MME.

FIG. 6 is a diagram illustrating a UE-local server session detection operation of the MME according to an embodiment of the present disclosure.

Data Transmission Path Setup Method

The communication session of the UE may be classified into one of two types depending on whether there is the server storing the data requested by the UE. That is, if the requested data is stored in the external server (CN) connected to the Internet outside the mobile network, the UE establishes a session with the external server and, otherwise if the requested data is stored in the local server inside the mobile network, a session with the local server.

If the inter-L-GW handover is triggered in the course of receiving data through the session with the CN or the local server, it is necessary to establish an optimized data transmission path while guaranteeing data transmission continuity. The optimized data transmission path may be determined differently depending on the type of the session as depicted in FIGS. 7 and 8.

Figure 7:
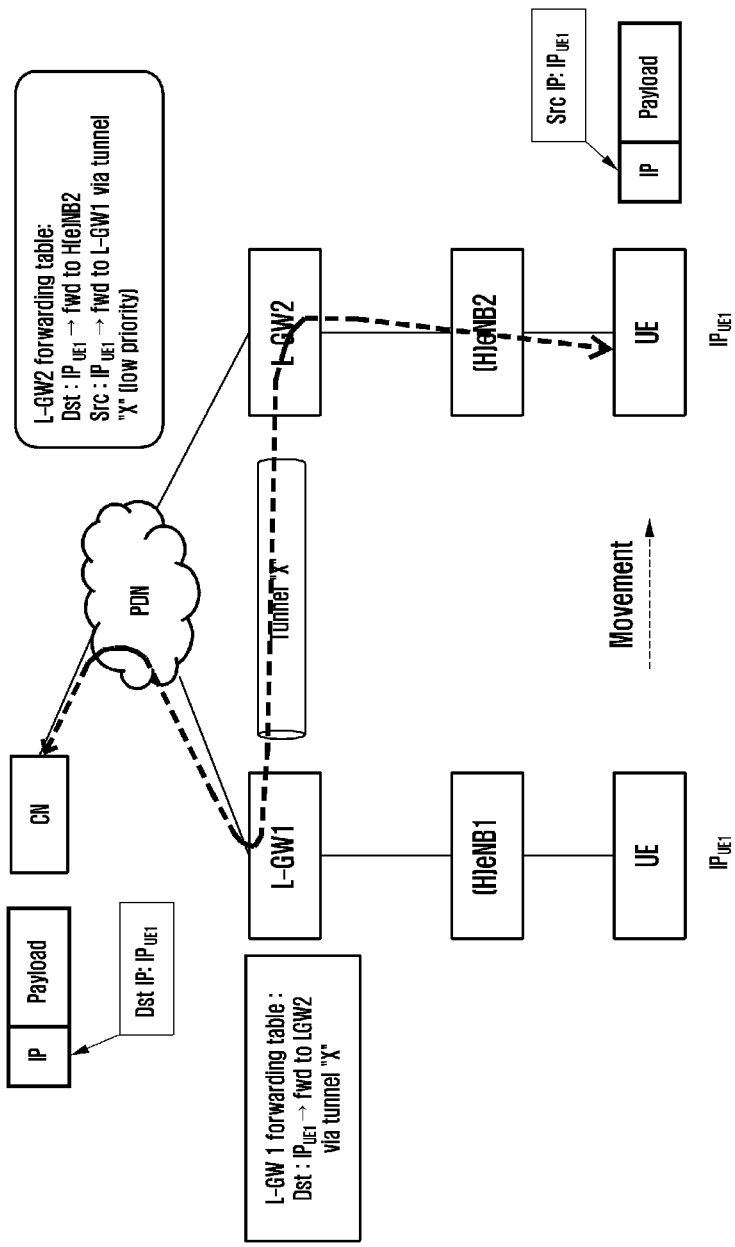
FIG. 7 is a diagram illustrating a data transmission setup for the session connected to an external server in handover according to an embodiment of the present disclosure.
Figure 8:
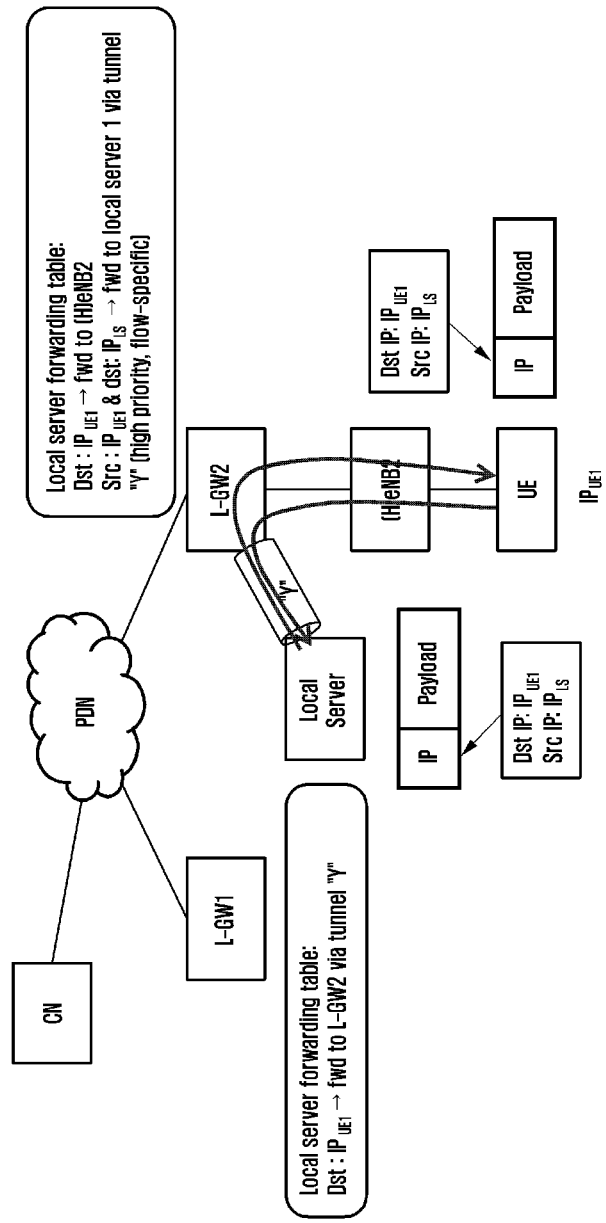
FIG. 8 is a diagram illustrating a data transmission setup for the session connected to a local server in handover according to an embodiment of the present disclosure.

If the UE handover occurs from the L-GW1 to the L-GW2 in the course of downloading data through the session established with the external server, the packet transmission path of the corresponding session is established such that the packet is forwarded from the L-GW1 to the L-GW2 through the inter-L-GW tunnel as shown in FIG. 7.

FIG. 7 is a diagram illustrating a data transmission setup for the session connected to an external server in handover according to an embodiment of the present disclosure.

In detail, if the UE IP is IP_UE1, the data transmission table of the L-GW1 is configured such that the packet of which destination IP address (Dst IP) is set to IP_UE1 is forwarded to the L-GW2 through the Tunnel "X" connected to the L-GW2. At this time, the data transmission table of the L-GW2 is configured such that the packet of which destination IP address (Dst IP) is set to IP_UE1 is transmitted to the target eNB (HeNB 2) to which the UE is handed over and the packet of which source IP address (Src IP) is set to IP_UE1 is forwarded through the Tunnel "X" connected to the L-GW1.

If the UE handover occurs from the L-GW1 to the L-GW2 in the course of downloading data through the session established with the local server, the packet transmission path of the corresponding session is established such that the packet is transmitted from the local server to the target L-GW through the tunnel established between the local server and the target L-GW (L-GW2) as shown in FIG. 8.

FIG. 8 is a diagram illustrating a data transmission setup for the session connected to a local server in handover according to an embodiment of the present disclosure.

In detail, if the UE IP is IP_UE1 and the local server IP is IP_LS, the data transmission table of the local server is configured such that the packet of which the destination and source IP addresses (Dst IP and Src IP) are set respectively to IP_UE1 and IP_LS is forwarded to the L-GW2 through the Tunnel "Y" connected to the L-GW2. At this time, the data transmission table of the L-GW2 is configured such that the packet of which destination IP address (Dst IP) is set to IP_UE1 is transmitted to the target eNB (HeNB2) to which the UE is handed over and the packet of which source and destination IP addresses (Src IP and Dst IP) are respectively set to IP_UE1 and IP_LS is forwarded to the local server through the Tunnel "Y" connected to the local server.

Figure 9:
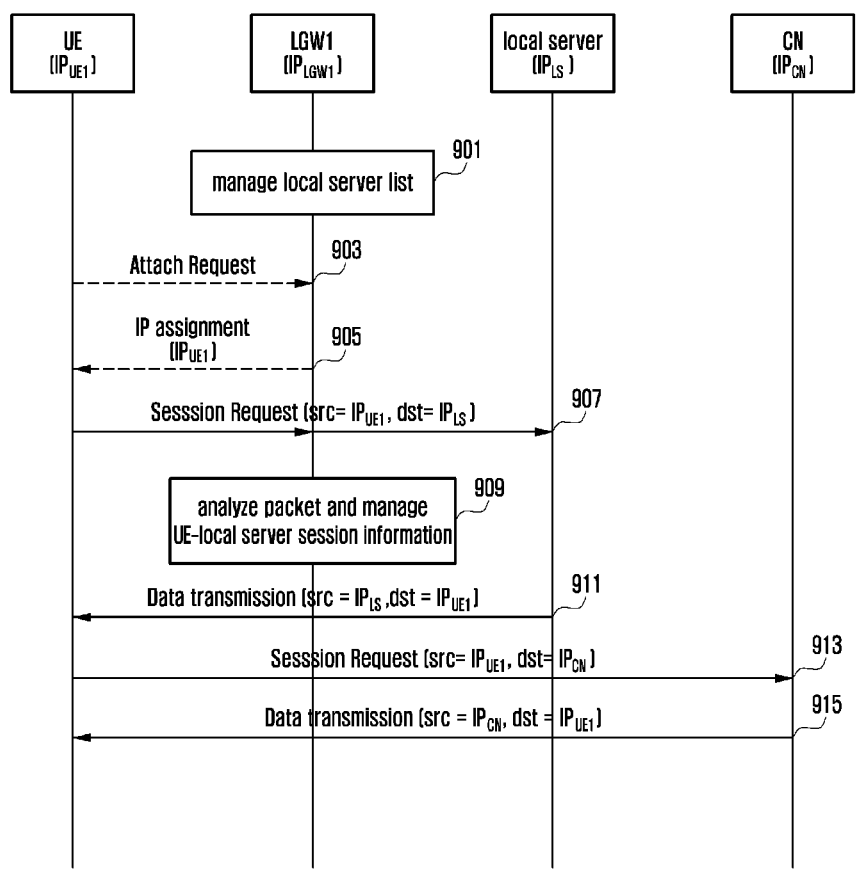
FIG. 9 is a signal flow diagram illustrating a session detection method according to an embodiment of the present disclosure.

FIG. 9 is a signal flow diagram illustrating a session detection method according to an embodiment of the present disclosure.

For explanation convenience, the eNB and the L-GW are regarded as the same entity, and the eNB-related signaling is expressed like a L-GW-related signal but with a dotted line. According to various embodiments, however, the eNB may be implemented as an independent entity connected to the L-GW as well as an entity integrated with the L-GW. In the following, the description is made under the assumption that the source eNB (HeNB1) and the target eNB (HeNB2) are connected to the L-GW1 and L-GW2, respectively.

Referring to FIG. 9, the L-GW1 manages a local server IP address list at operation 901.

The UE performs an initial attach procedure to the L-GW1 via the eNB1. In detail, the UE sends the L-GW1 an attachment request via the eNB1 at operation 903 and receives an attachment accept from the L-GW1 at operation 905. At this time, the L-GW1 sends the UE the IP address allocated to the UE (e.g., IP_UE1) along with the attachment accept.

In the case of downloading data from the local server, the UE sends the local server a packet for establishing a session with the local server at operation 907. If it is necessary to establish a TCP session with the local server, the UE sends the local server a TCP SYN packet. The UE transmits the packet to the L-GW1 via the eNB, and the L-GW1 analyzes the IP header of the packet through DPI process to check the destination IP address of the packet at operation 909. If the destination IP address of the packet exists in the local server IP address list managed by the L-GW1, the L-GW1 transmits the packet to the local server corresponding to the destination IP address and detects that a session is established between the UE and the corresponding local server. The L-GW1 may store and manage the session information, i.e., UE and local server IP addresses, and provides the MME with the session information in the UE handover afterward.

Upon receipt of the packet, the local server completes the session establishment with the UE and starts data transmission at operation 911.

In the case of attempting to establish a session with an external server (e.g., a server existing in the Internet outside the mobile carrier network) instead of the local server, the UE sends the external server a packet for establishing a session at operation 913. At this time, the information about the session with the external server may not be stored in the L-GW1.

Upon receipt of the packet, the external server completes the session establishment with the UE and starts data transmission at operation 915.

Figure 10:
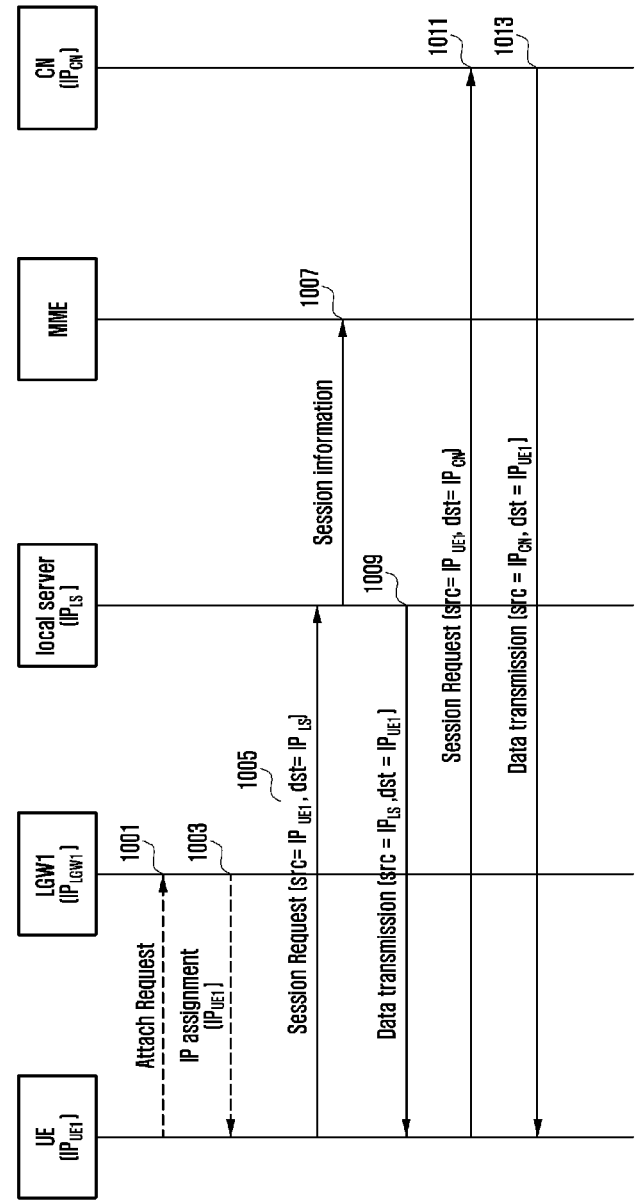
FIG. 10 is a signal flow diagram illustrating a session detection method according to another embodiment of the present disclosure.

FIG. 10 is a signal flow diagram illustrating a session detection method according to another embodiment of the present disclosure.

For explanation convenience, the eNB and the L-GW are regarded as the same entity, and the eNB-related signaling is expressed like a L-GW-related signal but with a dotted line. According to various embodiments of the present disclosure, however, the eNB may be implemented as an independent entity connected to the L-GW as well as an entity integrated with the L-GW. In the following, the description is made under the assumption that the source eNB (HeNB1) and the target eNB (HeNB2) are connected to the L-GW1 and L-GW2, respectively.

In this embodiment of the present disclosure, the L-GW1 may have no local server IP address list.

The UE performs an initial attach procedure to the L-GW1 via the eNB1. In detail, the UE sends the L-GW1 an attachment request via the eNB1 at operation 1001 and receives an attachment accept from the L-GW1 at operation 1003. At this time, the L-GW1 sends the UE the IP address allocated to the UE (e.g., IP_UE1) along with the attachment accept.

In the case of downloading data from the local server, the UE sends the local server a packet for establishing a session with the local server at operation 1005. The local server sends the MME the information on session established with the UE at operation 1007.

Then the local server completes the session establishment with the UE and starts data transmission at operation 1009.

In the case that the UE attempts to establish a session with an external server (e.g., a server existing in the Internet outside the mobile carrier network) instead of the local server, the UE sends the external server a packet for establishing a session at operation 1011. Upon receipt of the packet, the external server establishes the session with the terminal and starts data transmission at operation 1013.

Figure 11:
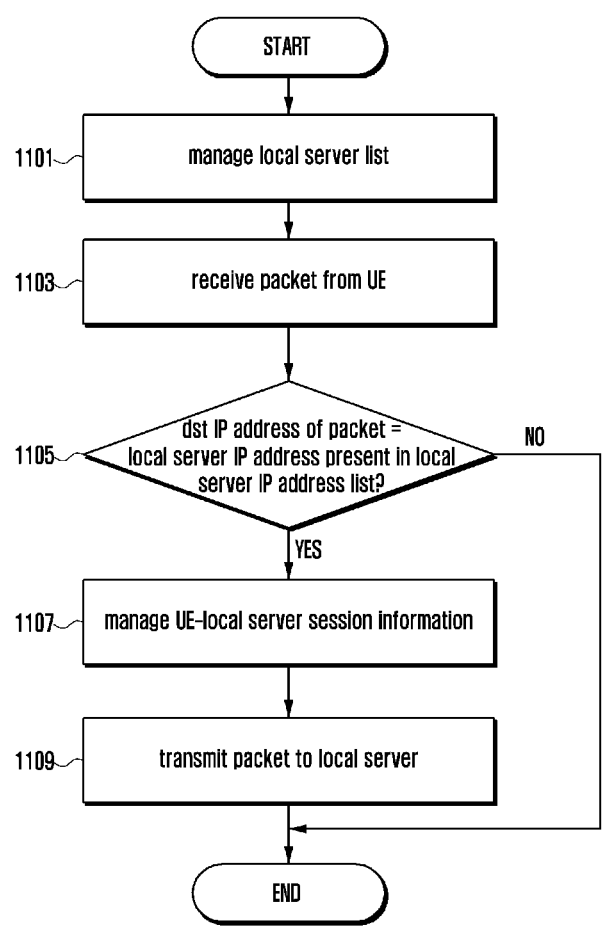
FIG. 11 is a flowchart illustrating an L-GW side procedure of the session detection method according to an embodiment of the present disclosure.

FIG. 11 is a flowchart illustrating an L-GW side procedure of the session detection method according to an embodiment of the present disclosure.

Referring to FIG. 11, the L-GW manages a local server IP address list at operation 1101.

The L-GW receives a packet from the UE at operation 1103 and analyzes the packet through an inspection method such as the DPI. At this time, the received packet may carry the session request for establishing a session with the location server. The L-GW determines whether the destination IP address (dst IP) of the packet exists in the local server IP address list at operation 1105.

If the destination IP address exists in the local server IP address list, the L-GW detects that the session is established between the UE and the corresponding local server and manages the UE-local server session information at operation 1107. The session information may include a UE IP address, a local server IP address, source and destination port numbers, and transport layer protocol type. Next, the L-GW forwards the received packet to the local server corresponding to the IP address at operation 1109.

If the destination IP address does not exist in the local server IP address list, the L-GW forwards the packet to the node corresponding to the destination IP address.

Figure 12:
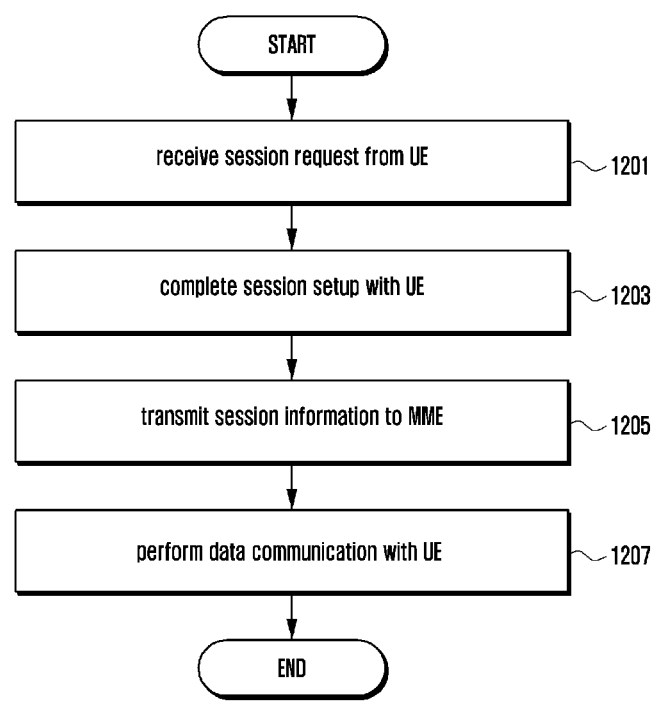
FIG. 12 is a flowchart illustrating a local server side procedure of the session detection method according to an embodiment of the present disclosure.

FIG. 12 is a flowchart illustrating a local server side procedure of the session detection method according to an embodiment of the present disclosure.

Referring to FIG. 12, the local server receives a session request from the UE at operation 1201. The local server establishes a session with the UE based on the information included in the session request at operation 1203.

In this embodiment of the present disclosure, the local server sends the MME the session information at operation 1205 after establishing the session with the UE. According to another embodiment of the present disclosure, this operation may be omitted.

Next, the local server performs data communication with the UE through the session established with the UE at operation 1207.

Figure 13:
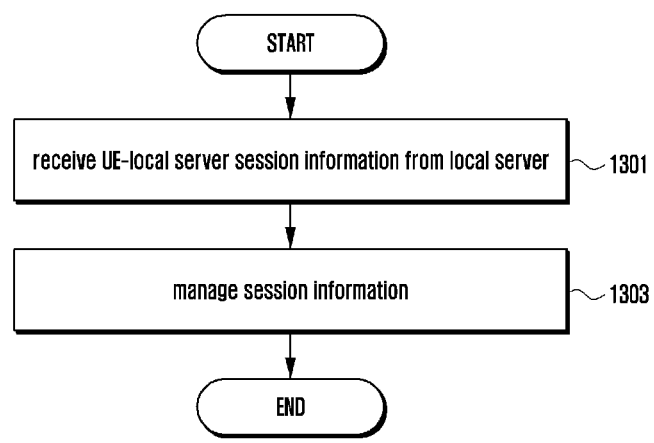
FIG. 13 is a flowchart illustrating an MME side procedure of the session detection method according to an embodiment of the present disclosure.

FIG. 13 is a flowchart illustrating an MME side procedure of the session detection method according to an embodiment of the present disclosure.

Referring to FIG. 13, the MME receives the session information about the session established between the UE and the local server from the local server according to an embodiment of the present disclosure at operation 1301.

Next, the MME retains the received session information and manages UE mobility based on the session information at operation 1303.

Figure 14:
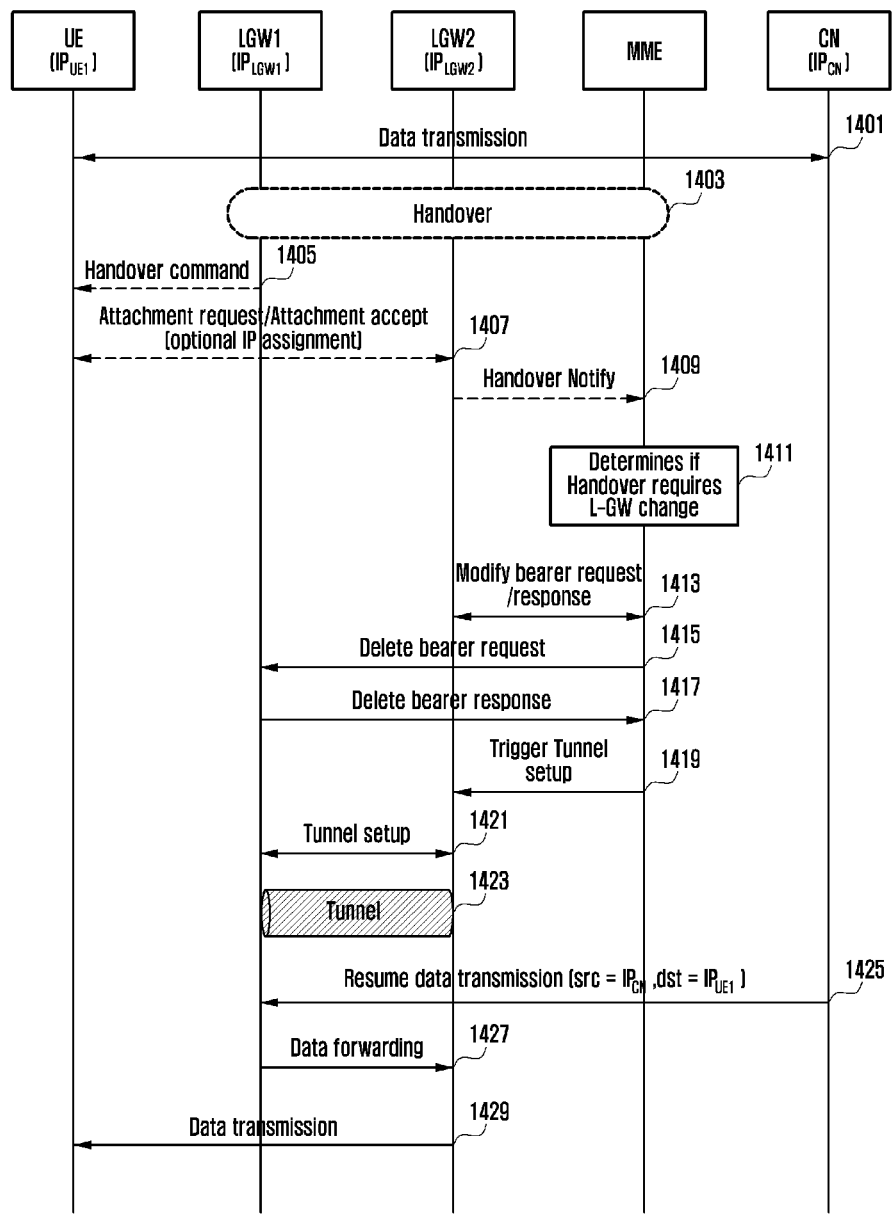
FIG. 14 is a signal flow diagram illustrating a transmission path establishment method for the session with an external server (CN) according to an embodiment of the present disclosure.

FIG. 14 is a signal flow diagram illustrating a transmission path establishment method for the session with an external server (CN) according to an embodiment of the present disclosure.

For explanation convenience, the eNB and the L-GW are regarded as the same entity, and the eNB-related signaling is expressed like a L-GW-related signal but with a dotted line. According to various embodiments of the present disclosure, however, the eNB may be implemented as an independent entity connected to the L-GW as well as an entity integrated with the L-GW. In the following, the description is made under the assumption that the source eNB (HeNB1) and the target eNB (HeNB2) are connected to the L-GW1 and L-GW2, respectively.

Referring to FIG. 14, the UE performs data communication through the session established with the external server at operation 1401.

If the roaming UE moves out of the service area of the source eNB (eNB1) and enters the service area of the target eNB (eNB2) in the course of data communication, the MME detects this and triggers a handover procedure between the source and destination eNBs (preparation and execution procedure) at operation 1403. Since the handover procedure of the MME is similar to the S1 handover specified in the LTE standard, a detailed description thereof is omitted herein.

Next, the source eNB connected to the L-GW1 sends the UE a handover command instructing to perform handover to the target eNB connected to the L-GW2 at operation 1405. The UE performs an attach procedure by exchanging the attachment request and attachment accept messages with the L-GW2 based on the handover command at operation 1407. At this time, the L-GW2 may allocate a new IP address to the UE.

If the UE attaches to the target eNB successfully, the target eNB sends the MME a handover complete (handover notify) message at operation 1409.

The MME determines whether the L-GW is changed as a result of the handover at operation 1411. If the L-GW is changed, the MME establishes a bearer between the L-GW2 and the target eNB by exchanging Modify Bearer Request and Response messages with the L-GW2 at operation 1413.

In the case that the L-GW is changed, the MME further sends the L-GW1 a Delete Bearer Request message with the inquiry about the presence of any ongoing session of the UE at operation 1415. If the ongoing session is present, the L-GW1 sends the MME the session information at operation 1417. The L-GW1 may send the MME the session information about the session between the UE and the external server, e.g., a UE IP address, an external server IP address, source and destination port numbers, and a transport layer protocol type.

Afterward, the MME instructs the L-GW2 to establish a tunnel between the L-GW1 and L-GW2 for the optimized data transmission path guaranteeing the session continuity. In detail, the MME sends the L-GW2 a Tunnel Setup Trigger message at operation 1419. The L-GW2 exchanges Tunnel Setup Request and Response message with the L-GW1 to set up the tunnel at operation 1421. If the tunnel is set up, the tunnel is established between the L-GW1 and L-GW2 at operation 1423.

The data received from the external server is forwarded to the UE through the tunnel. In detail, the external server transmits data to the L-GW1 at operation 1425, and the L-GW1 forwards the received data to the L-GW2 through the tunnel at operation 1427. The L-GW2 delivers the data received through the tunnel to the UE at operation 1429. The data transmission path from the UE to the external server may be established in inverse order of the above-described download transmission path.

Figure 15:
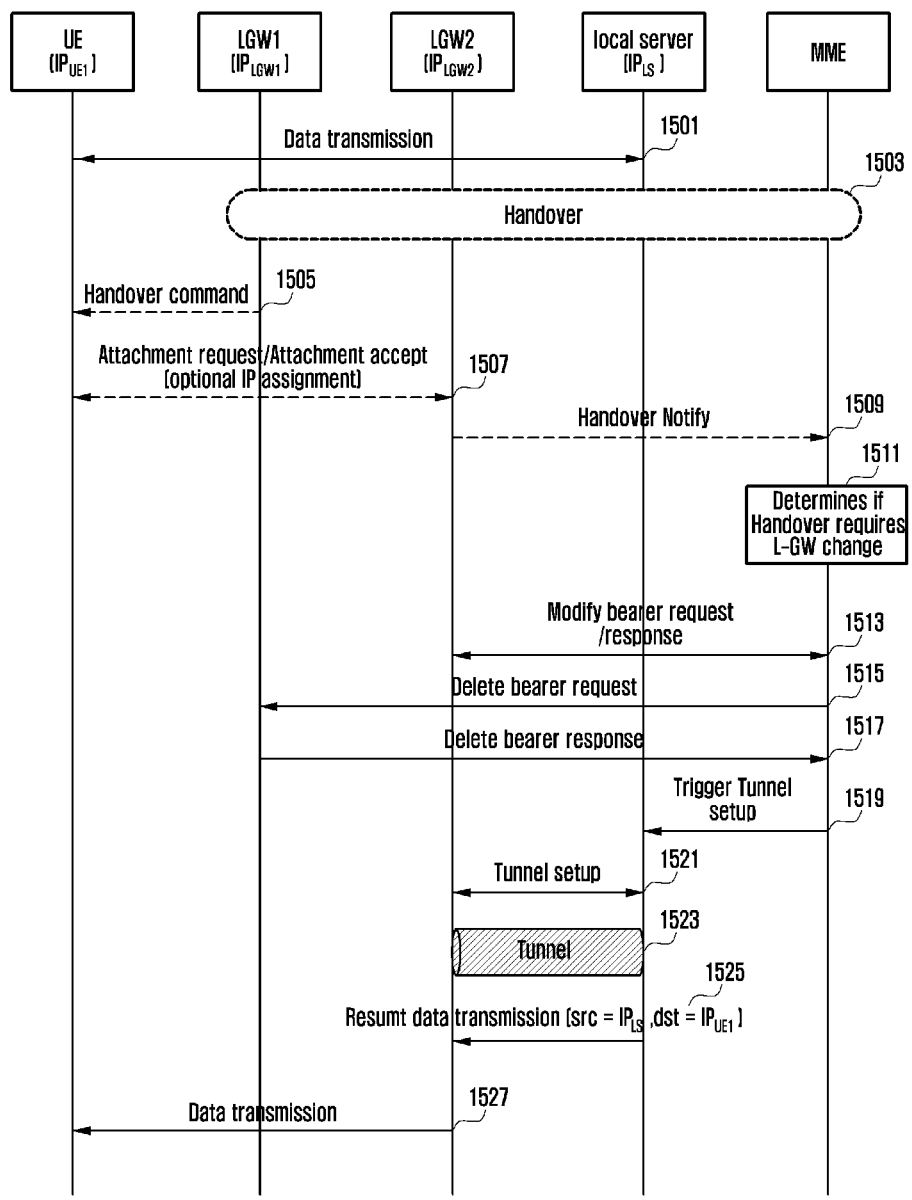
FIG. 15 is a signal flow diagram illustrating a transmission path configuration method for the session with a local server according to an embodiment of the present disclosure.

FIG. 15 is a signal flow diagram illustrating a transmission path configuration method for the session with a local server according to an embodiment of the present disclosure.

For explanation convenience, the eNB and the L-GW are regarded as the same entity, and the eNB-related signaling is expressed like a L-GW-related signal but with a dotted line. According to various embodiments, however, the eNB may be implemented as an independent entity connected to the L-GW as well as an entity integrated with the L-GW. In the following, the description is made under the assumption that the source eNB (HeNB1) and the target eNB (HeNB2) are connected to the L-GW1 and L-GW2, respectively.

Referring to FIG. 15, the UE communicates data through the session established with the local server at operation 1501.

If the roaming UE moves out of the service area of the source eNB (eNB1) and enters the service area of the target eNB (eNB2) in the course of data communication, the MME detects this and triggers a handover procedure between the source and destination eNBs (preparation and execution procedure) at operation 1503.

Operations 1505 to 1517 of FIG. 15 are identical to operations 1405 to 1417 of FIG. 14 and thus descriptions of operations 1505 to 1517 will be omitted for conciseness.

Afterward, the MME triggers tunnel setup between the local server and the L-GW2 for securing the optimized data transmission path guaranteeing the session continuity. In detail, the MME sends the local server a Tunnel Setup Trigger message at operation 1519. If the tunnel setup is completed in operation 1521, the tunnel is established between the local server and the L-GW2 at operation 1523.

The data received from the local server is transmitted to the UE through the tunnel. In detail, the local server forwards the data to the L-GW2 through the tunnel at operation 1525, and the L-GW2 delivers the data to the UE at operation 1527.

Figure 16:
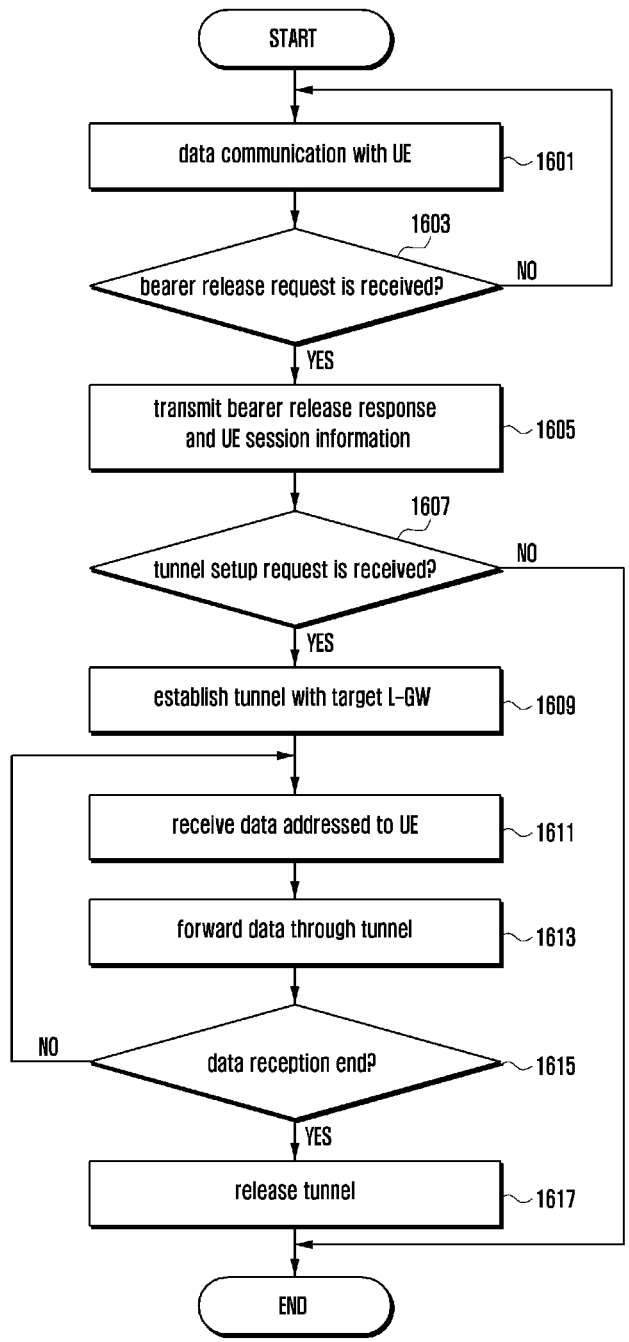
FIG. 16 is a flowchart illustrating an L-GW side procedure of the transmission path setup method according to an embodiment of the present disclosure.

FIG. 16 is a flowchart illustrating an L-GW side procedure of the transmission path setup method according to an embodiment of the present disclosure.

Referring to FIG. 16, the L-GW communicates data with the UE at operation 1601. If a bearer release request is received from the MME due to the handover of the UE at operation 1603, the L-GW releases the bearer established with the source eNB and sends the MME a bearer release response and the session information about the ongoing session of the UE at operation 1605. Here, the session information may be the information on the session established with an external server or a local server.

Afterward, if a tunnel setup request is received from the target L-GW connected to the target eNB at operation 1607, the L-GW establishes a tunnel with the target L-GW at operation 1609. The tunnel setup request may be received in response to the information on the session established between the external server and the UE.

After the tunnel is established, the L-GW receives the data addressed to the UE at operation 1611 and forwards the data through the tunnel at operation 1613.

If the data transmission to the UE ends at operation 1615, the L-GW releases the tunnel at operation 1617.

Figure 17:
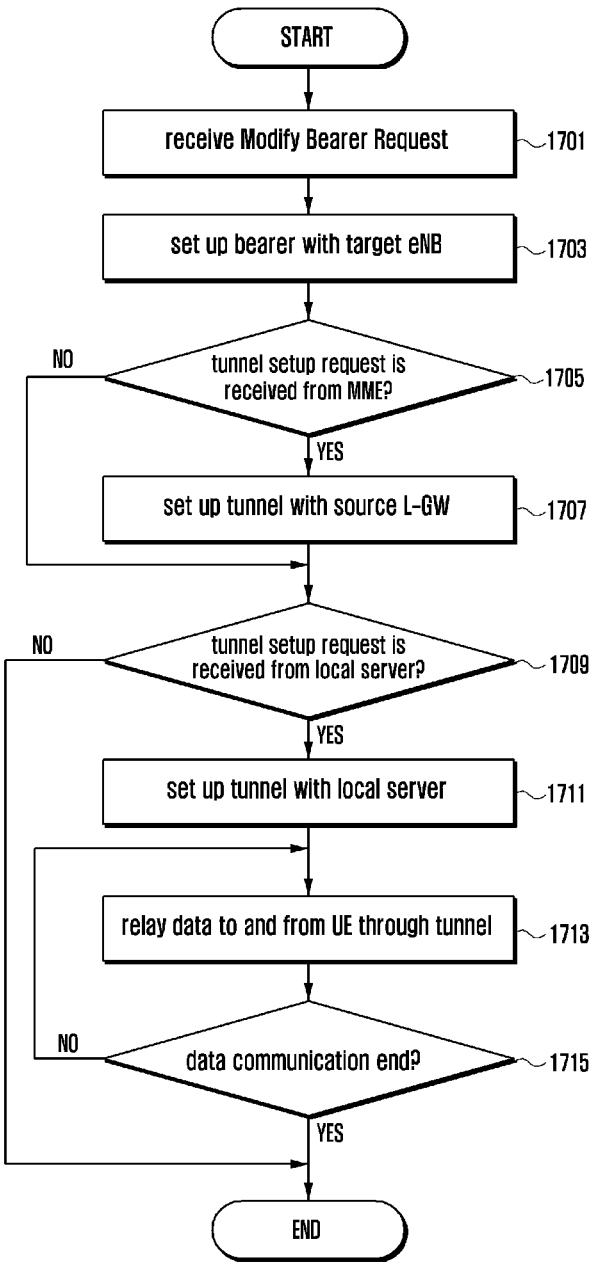
FIG. 17 is a flowchart illustrating a target L-GW side procedure of the transmission path setup method according to an embodiment of the present disclosure.

FIG. 17 is a flowchart illustrating a target L-GW side procedure of the transmission path setup method according to an embodiment of the present disclosure.

Referring to FIG. 17, the L-GW receives a Modify Bearer Request from the MME due to the UE handover at operation 1701. The L-GW establishes a bearer with the target eNB of the UE handover and sends the MME a Modify Bearer Response in response to the Modify Bearer Request at operation 1703.

Afterward, if a Tunnel Setup Request is received from the MME at operation 1705, the target L-GW sets up a tunnel with the source L-GW at operation 1707. The MME transmits the Tunnel Setup Request when the UE is communicating data with the external server through the ongoing session before the handover.

If the Tunnel Setup Request is received from the local server at operation 1709, the L-GW sets up a tunnel with the local server at operation 1711. The local server transmits the tunnel setup request when the UE is communication data with the local server through the ongoing session before the handover.

Although FIG. 17 shows that the operations of receiving, at the L-GW, the tunnel setup request from the MME or the local server performed in a chronicle order for convenience purpose, the operations are not limited thereto but may be performed in different orders.

Afterward, the L-GW delivers the data received through the tunnel to the UE and relays the data transmitted by the UE to the external server or the local server through the tunnel at operation 1713.

If the data communication ends at operation 1715, the L-GW releases the tunnel.

Figure 18:
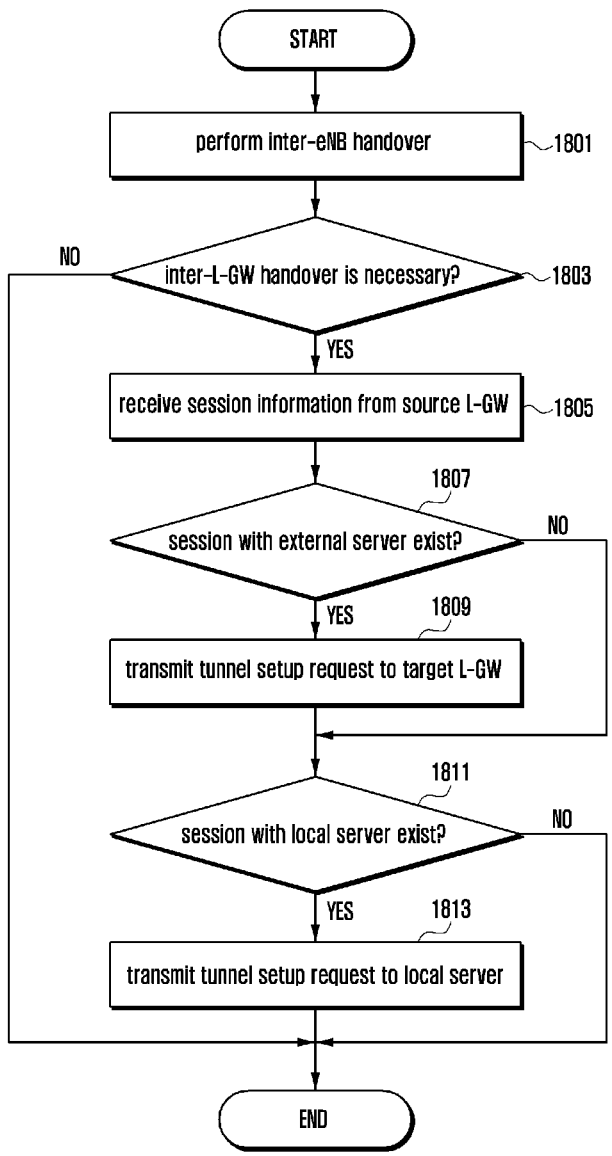
FIG. 18 is a flowchart illustrating an MME side procedure of the transmission path setup method according to an embodiment of the present disclosure.

FIG. 18 is a flowchart illustrating an MME side procedure of the transmission path setup method according to an embodiment of the present disclosure.

Referring to FIG. 18, the MME performs inter-eNB handover as the UE roams at operation 1801. If an inter-L-GW handover is triggered at operation 1803, the MME receives the information about the ongoing session of the UE from the source L-GW at operation 1805.

If it is determined that the UE has an ongoing session with the external server at operation 1807, the MME sends the target L-GW a Tunnel Setup Request for setup of a tunnel with the source L-GW at operation 1809. If it is determined that the UE has an ongoing session with the local server at operation 1811, the MME sends the local server the tunnel setup request at operation 1813.

Although FIG. 18 shows that the operations of determining, at the MME, whether the UE has an ongoing session with the external server or the local server are performed in a chronicle order for convenience purpose, the operations are not limited thereto but may be performed in different orders.

Figure 19:
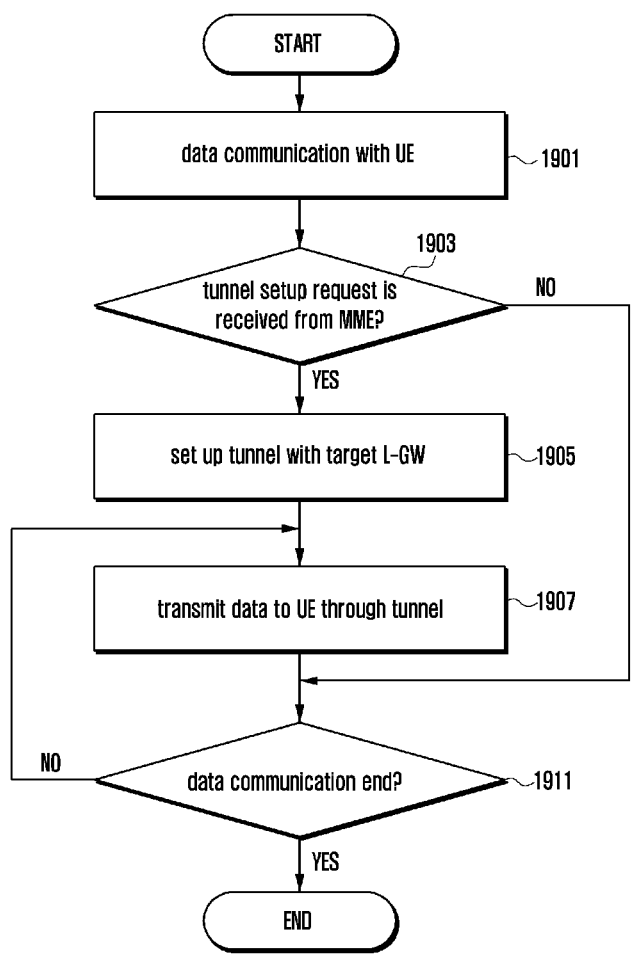
FIG. 19 is a flowchart illustrating a local server side procedure of the transmission path setup method according to an embodiment of the present disclosure.

FIG. 19 is a flowchart illustrating a local server side procedure of the transmission path setup method according to an embodiment of the present disclosure.

Referring to FIG. 19, the local server communicates data with the UE at operation 1901. If a tunnel setup up request is received from the MME due to the UE handover at operation 1903, the local server sets up a tunnel with the target L-GW at operation 1905. Afterward, the local server transmits data to the UE through the tunnel at operation 1907 and, if the data transmission ends at operation 1911, releases the bearer.

Figure 20:
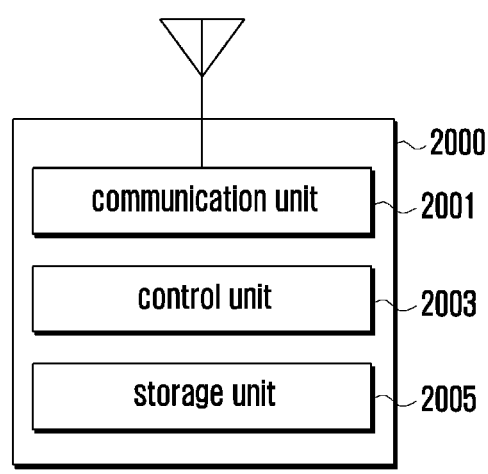
FIG. 20 is a block diagram illustrating a configuration of a data transmission/reception device according to an embodiment of the present disclosure.

FIG. 20 is a block diagram illustrating a configuration of a data transmission/reception device according to an embodiment of the present disclosure.

Referring to FIG. 20, the data transmission/reception device may be a UE, L-GW, or MME according to an embodiment of the present disclosure.

The data transmission/reception device 2000 includes a communication unit 2001, a control unit 2003, and a storage unit 2005.

The communication unit 2001 communication unit is responsible for data communication with at least one other device.

The control unit 2003 controls the other components to perform the operations according to an embodiment of the present disclosure. For example, the control unit 2003 may control the other components to perform the operations such as session establishment, session detection, handover, and optimized data path setup based on the session information in handover.

The storage unit 2005 may store the information necessary for performing the operations according to an embodiment of the present disclosure such as local server information (e.g., IP address).

The data communication method according to an embodiment of the present disclosure can be applied to the current standard architecture in the following scenarios.

For communication with the local server, the UE uses the IP address allocated by the PDN Gateway (P-GW) or L-GW. Unlike the legacy system in which the MME performs bearer setup to establish the data transmission path for new PDN connection, it is assumed that the eNB or femto cell (HeNB) sets up a direct transmission path with the local server using a method such as DPI.

(1) Local Network (LIMONET) Application Scenario

Figure 21:
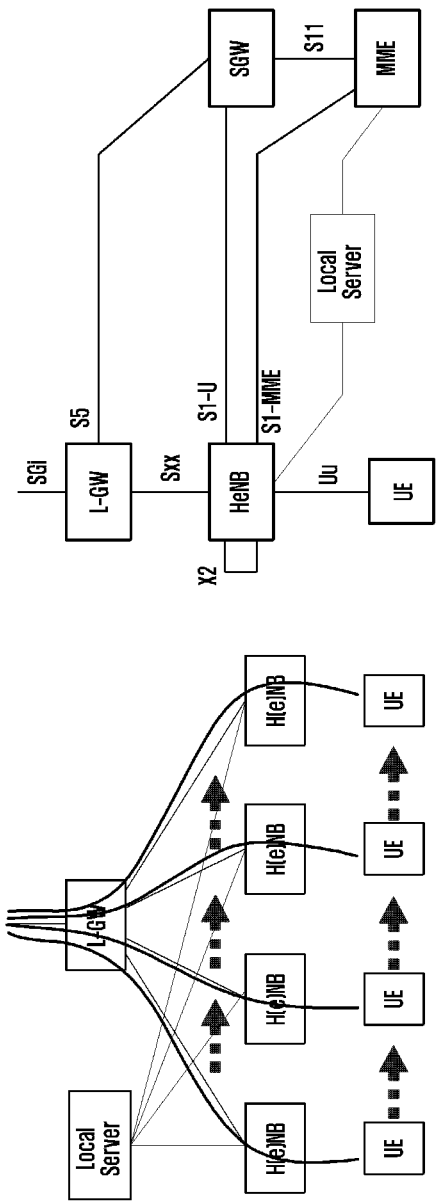
FIG. 21 is a diagram illustrating a data communication operation when the present disclosure is applied to the LIMONET according to an embodiment of the present disclosure.

FIG. 21 is a diagram illustrating a data communication operation when the present disclosure is applied to the LIMONET according to an embodiment of the present disclosure.

As described above, the LIMONET supports inter-HeNB handover in an L-GW domain. In order to use the local server through the optimized transmission path in this architecture, it is preferred to form an interface between the local server and the HeNB as shown in FIG. 21 rather than between the L-GW and local server. Accordingly, it is possible to set up the shortest transmission path using the MME-local server interface for the control plane defined in the present disclosure and the local server-HeNB interface for the user plane.

In the above scenario, the call flow for inter-HeNB handover of the UE is as follows.

Figure 22:
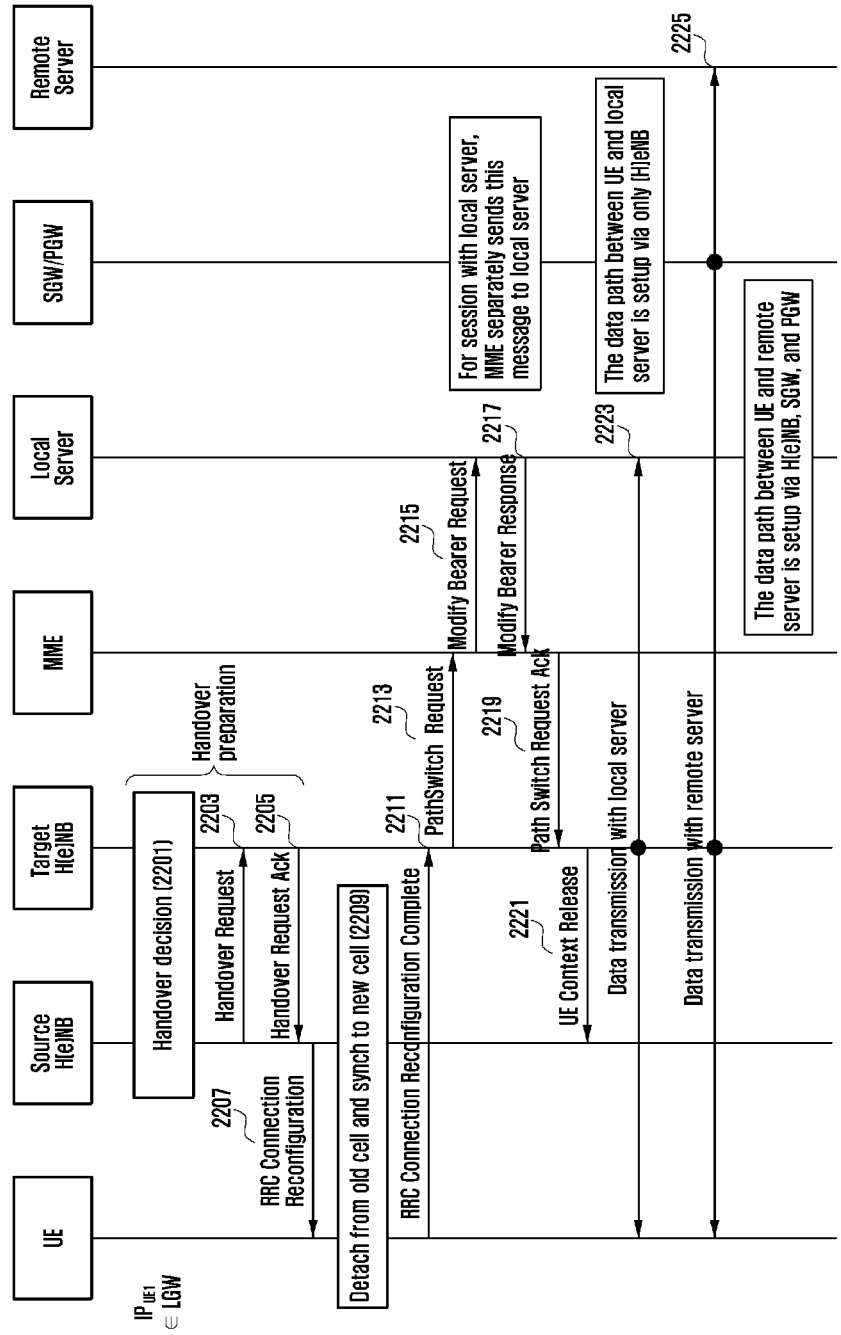
FIG. 22 is signal flow diagram illustrating a data communication procedure when the present disclosure is applied to the LIMONET according to an embodiment of the present disclosure.

FIG. 22 is signal flow diagram illustrating a data communication procedure when the present disclosure is applied to the LIMONET according to an embodiment of the present disclosure.

Referring to FIG. 22, the source and destination eNBs prepare and execute handover, and the UE completes attachment to the target HeNB through operations 2201 to 2211. More specifically, a decision to handover is made in operation 2201. The source eNB sends a handover request message to the target eNB in operation 2203. The target eNB sends a handover request acknowledgment message to the source eNB in operation 2205. The source eNB sends an RRC connection reconfiguration message to the UE in operation 2207. The UE detaches from the source eNB and synchronizes to the target eNB in operation 2209. The UE sends an RRC connection reconfiguration complete message to the target eNB in operation 2211.

Target eNB sends the MME a path switch request message at operation 2213.

The MME performs bearer setup with the legacy Serving Gateway (S-GW) and independent bearer setup to establish the transmission path with the local server in response to the request at operations 2215 and 2217. More specifically, the MME sends a modify bearer request message to the local server in operation 2215. The local server sends a modify bearer response message to the MME in 2217.

If the bearer setup is completed with the local server, the MME sends the target eNB a path switch request acknowledgment (ack) at operation 2219.

The target eNB sends the source eNB a resource release signal for releasing the resource allocated to the UE at operation 2221.

In order to resume the communication with the local server, the UE sets up a transmission path connecting the UE, the target eNB, and the local server; and resumes the data transmission through this path at operation 2223.

In order to resume the communication with the external server, the UE sets up a transmission path connecting the UE, the target eNB, the S-GW/P-GW, and the external server; and resumes data transmission through this path at operation 2225.

(2) LTE Macro Network Application Scenario

Similar to the scenario (1), it is possible to set up a short transmission path with the local server in the macro network architecture of LTE. First, the UE may set up a session with the local server via the HeNB1 (in this case, there has to be a user plane interface between the local server and the HeNB). If the inter-HeNB handover occurs, the UE resumes the transmission with the local server via the target HeNB (HeNB2) as shown in the bottom left part of FIG. 23. This can be achieved when a control plane interface for signaling between the MME and the local server. For reference, the session with the remote server is established through the user plane transmission path of the legacy LTE (UE-HeNB-S-GW-P-GW-remote server).

Figure 23:
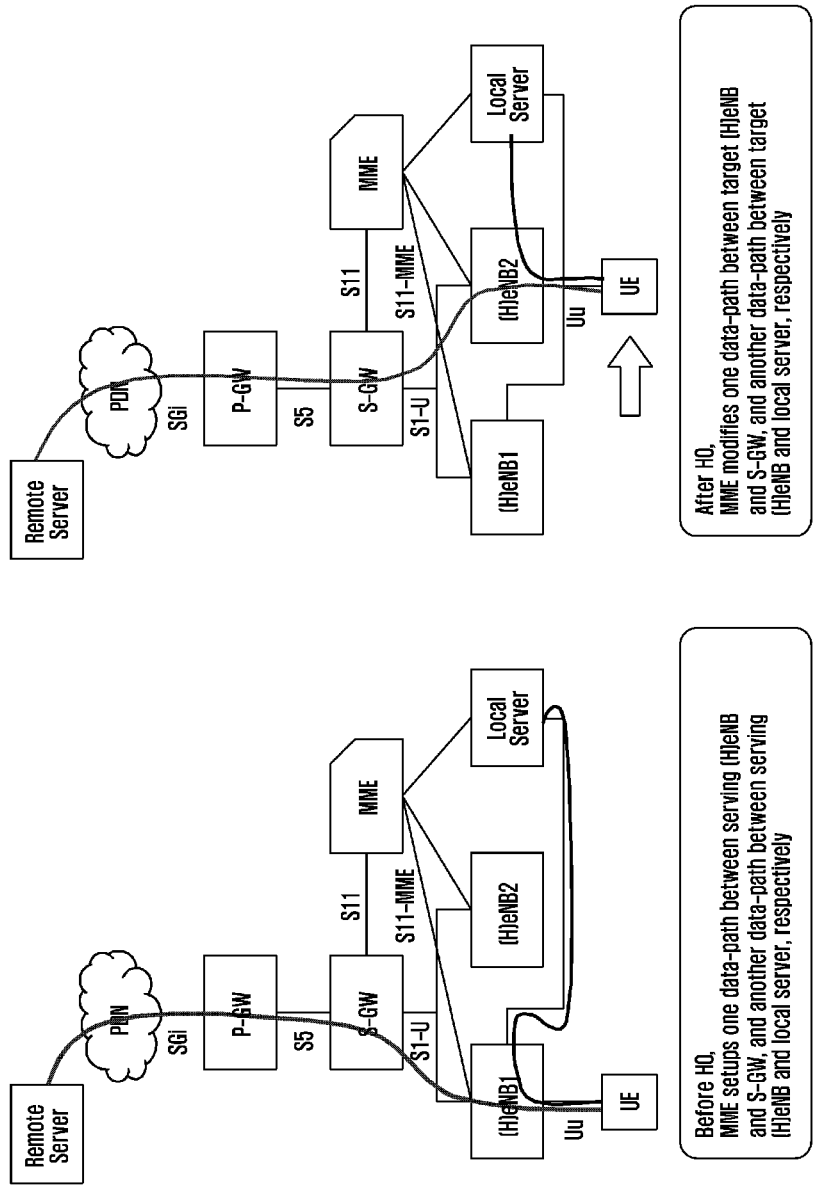
FIG. 23 is a diagram illustrating a data communication operation when the present disclosure is applied to the Long Term Evolution (LTE) macro network according to an embodiment of the present disclosure.

In the above scenario, the call flow for inter-HeNB handover of the UE is created as shown in FIG. 23. The call flow of FIG. 23 can be detailed as shown in the signal flow diagram of FIG. 4 of which is similar to the above-described LIMONET scenario.

FIG. 23 is a diagram illustrating a data communication operation when the present disclosure is applied to the LTE macro network according to an embodiment of the present disclosure.

In the above scenario, the call flow for the handover of the UE from the HeNB1 to the HeNB2 connected to the S-GW is as follows.

Figure 24:
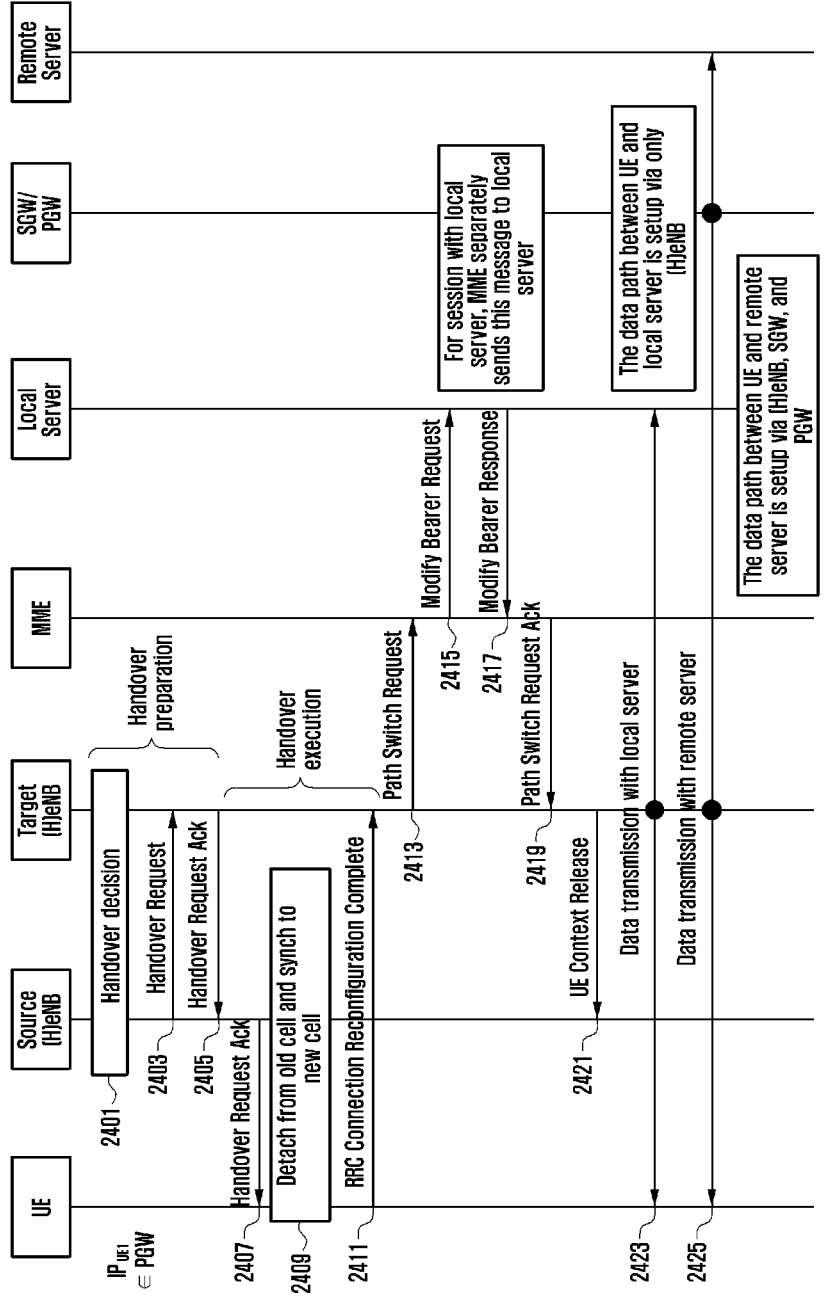
FIG. 24 is a signal flow diagram illustrating a data communication procedure when the present disclosure is applied to the LTE macro network according to an embodiment of the present disclosure.

FIG. 24 is a signal flow diagram illustrating a data communication procedure when the present disclosure is applied to the LTE macro network according to an embodiment of the present disclosure.

Referring to FIG. 24, the inter-HeNB handover from the source HeNB (HeNB1) to the target HeNB (HeNB2) are prepared and executed and thus the UE completes attachment to the target eNB (HeNB2) through operations 2401 to 2411. More specifically, a decision to handover is made in operation 2401. The source eNB sends a handover request message to the target eNB in operation 2403. The target eNB sends a handover request acknowledgment message to the source eNB in operation 2405. The source eNB sends an RRC connection reconfiguration message to the UE in operation 2407. The UE detaches from the source eNB and synchronizes to the target eNB in operation 2409. The UE sends an RRC connection reconfiguration complete message to the target eNB in operation 2411.

The target eNB sends the MME a path switch request message at operation 2413.

The MME performs bearer setup with the legacy S-GW and independent bearer setup to establish the transmission path with the local server in response to the request at operations 2415 and 2417. More specifically, the MME sends a modify bearer request message to the local server in operation 2415. The local server sends a modify bearer response message to the MME in 2417.

If the bearer setup is completed with the local server, the MME sends the target eNB a path switch request ack at operation 2419.

The target eNB sends the source eNB a resource release signal for releasing the resource allocated to the UE at operation 2421.

In order to resume the communication with the local server, the UE sets up the transmission path connecting the UE, the target eNB, and the local server; and resumes the data transmission through this path at operation 2423.

In order to resume the communication with the external server, the UE sets up a transmission path connecting the UE, the target eNB, the S-GW/P-GW, and the external server; and resumes data transmission through this path at operation 2425.

As described above, the present disclosure is advantageous in terms of guaranteeing the best transmission path by maintaining the shortest path between the UE and the local server without session breakage even in the inter-L-GW handover. Also, the present disclosure is advantageous in terms of minimizing service delay in view of the user and traffic amount over the core network in view of the service provider, resulting in reduction of capital expenditures (CAPEX)/operational expenditures (OPEX).

It is to be appreciated that those skilled in the art can change or modify the various embodiments without departing the technical concept of this disclosure. Accordingly, it should be understood that above-described embodiments are essentially for illustrative purpose only but not in any way for restriction thereto.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a mobility management entity (MME) for supporting inter-gateway handover of a terminal, the method comprising:
  acquiring, by the MME, when a handover from a source local gateway to a target local gateway is detected, information on a session between the terminal and a local server present outside a public data network (PDN), the local server storing data to be provided for the terminal via the target local gateway; and
  transmitting, by the MME, a tunnel setup command to the local server through a direct interface established with the local server,
  wherein the tunnel setup command instructs to establish a tunnel through which the data is transmitted from the local server to the target local gateway, and
  wherein the local server and the local gateway are separate entities.

2. The method of claim 1, wherein the information on the session comprises at least one of an internet protocol (IP) address of the terminal, an IP address of the local server, source and destination port numbers, a transport layer protocol, or a destination domain name.

3. The method of claim 1, wherein the acquiring of the information on the session comprises receiving the information on the session from the source local gateway which analyzes packets exchanged between the terminal and the local server and manages the information on the session.

4. The method of claim 1, wherein the acquiring of the information on the session comprises receiving the information on the session from the local server.

5. A communication method of a source local gateway supporting inter-gateway handover of a terminal, the method comprising:
   identifying, by the source local gateway, a local server present outside a public data network (PDN), the local server storing data to be provided for the terminal via a target local gateway; and
   transmitting, by the source local gateway, information on a session between the terminal and the local server to a mobility management entity (MME),
   wherein the local server and the local gateway are separate entities, and
   wherein the local server receives a tunnel setup command from the MME through a direct interface established with the MME.

6. The method of claim 5, wherein the information on the session comprises at least one of an internet protocol (IP) address of the terminal, an IP address of the local server, source and destination port numbers, a transport layer protocol, or a destination domain name.

7. The method of claim 5, wherein the information on the session is used for transmitting, when a handover from the source local gateway to a target local gateway is detected, the tunnel setup command to the local server though an interface established with the local server.

8. A communication method of a local server supporting inter-gateway handover of a terminal and present outside a public data network (PDN), the method comprising:
   receiving, by the local server, the tunnel setup command from a mobility management entity (MME) through a direct interface established with the MME, the tunnel setup command being generated when a handover from a source local gateway to a target local gateway occurs;
   setting up, by the local server, a tunnel with the target local gateway through an interface established with the target local gateway; and
   transmitting, by the local server, data addressed to the terminal to the target local gateway through the tunnel,
   wherein the local server and the local gateway are separate entities.

9. The method of claim 8, further comprising:
   managing information on a session with the terminal; and
   transmitting, when the handover from the source local gateway to the target local gateway occurs, the information on the session to the MME.

10. The method of claim 9, wherein the information on the session comprises at least one of an (IP) address of the terminal, an IP address of the local server, source and destination port numbers, a transport layer protocol, or a destination domain name.

11. A mobility management entity (MME) supporting inter-gateway handover of a terminal, the MME comprising:
   a communication unit configured to perform data communication; and
   at least one processor configured to:
      acquire, when a handover from a source local gateway to a target local gateway is detected, information on a session between the terminal and a local server present outside a public data network (PDN), the local server storing data to be provided for the terminal via the target local gateway, and
      control the communication unit to transmit, a tunnel setup command to the local server through a direct interface established with the local server,
   wherein the tunnel setup command instructs to establish a tunnel through which the data is transmitted from the local server to the target local gateway, and
   wherein the local server and the local gateway are separate entities.

12. The MME of claim 11, wherein the at least one processor is further configured to control the communication unit to receive the information on the session from the source local gateway which analyzes packets exchanged between the terminal and the local server and manages the information on the session.

13. The MME of claim 11, wherein the at least one processor is further configured to control the communication unit to receive the information on the session from the local server.

14. A source local gateway supporting inter-gateway handover of a terminal, the source local gateway comprising:
   a communication unit configured to perform data communication; and
   at least one processor configured to:
      identify a local server present outside a public data network (PDN), the local server storing data to be provided for the terminal via a target local gateway, and
      control the communication unit to transmit information on a session between the terminal and the local server to a mobility management entity (MME),
   wherein the local server and the local gateway are separate entities, and
   wherein the local server receives a tunnel setup command from the MME through a direct interface established with the MME.

15. A local server supporting inter-gateway handover of a terminal and present outside a public data network (PDN), the local server comprising:
   a communication unit which performs data communication; and
   at least one processor configured to control the communication unit to:
      receive a tunnel setup command from a mobility management entity (MME) through a direct interface established with the MME, the tunnel setup command being generated when a handover from a source local gateway to a target local gateway occurs,
      set up a tunnel with the target local gateway through an interface established with the target local gateway, and
      transmit data addressed to the terminal to the target local gateway through the tunnel,
   wherein the local server and the local gateway are separate entities.

16. The local server of claim 15, wherein the at least one processor is further configured to:
   manage information on a session with the terminal, and
   control the communication unit to transmit, when the handover from the source local gateway to the target local gateway occurs, the information on the session to the MME.

* * * * *